(12) United States Patent
Horstkemper et al.

(10) Patent No.: US 8,608,896 B2
(45) Date of Patent: Dec. 17, 2013

(54) LIQUID ADHESIVE LAMINATION FOR PRECISION ADHESIVE CONTROL

(75) Inventors: Ralf Horstkemper, San Francisco, CA (US); Casey J. Feinstein, San Jose, CA (US); Kuo-Hua Sung, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/231,818

(22) Filed: Sep. 13, 2011

(65) Prior Publication Data

US 2013/0062011 A1 Mar. 14, 2013

(51) Int. Cl.
*B05D 1/14* (2006.01)

(52) U.S. Cl.
USPC ............ 156/295; 156/87; 427/457; 427/458; 427/466; 427/469; 427/131

(58) Field of Classification Search
USPC ............ 156/295, 87; 427/457, 458, 466, 469, 427/131
See application file for complete search history.

(56) References Cited

U.S. PATENT DOCUMENTS

| | | | | |
|---|---|---|---|---|
| 3,716,434 | A * | 2/1973 | Cook et al. | 156/157 |
| 4,428,793 | A * | 1/1984 | Sato et al. | 156/285 |
| 4,470,858 | A * | 9/1984 | McMaster | 156/103 |
| 4,515,297 | A * | 5/1985 | Schoenthaler et al. | 222/160 |
| 4,803,124 | A * | 2/1989 | Kunz | 428/200 |
| 5,483,261 | A | 1/1996 | Yasutake | |
| 5,488,204 | A | 1/1996 | Mead et al. | |
| 5,825,352 | A | 10/1998 | Bisset et al. | |
| 5,835,079 | A | 11/1998 | Shieh | |
| 5,880,411 | A | 3/1999 | Gillespie et al. | |
| 6,188,391 | B1 | 2/2001 | Seely et al. | |
| 6,310,610 | B1 | 10/2001 | Beaton et al. | |
| 6,323,846 | B1 | 11/2001 | Westerman et al. | |
| 6,476,504 | B1 | 11/2002 | Chu et al. | |
| 6,685,794 | B2 | 2/2004 | Shinohara et al. | |
| 6,690,387 | B2 | 2/2004 | Zimmerman et al. | |

(Continued)

FOREIGN PATENT DOCUMENTS

| | | |
|---|---|---|
| JP | 2000-163031 A | 6/2000 |
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Jeff Aftergut
*Assistant Examiner* — Jaeyun Lee
(74) *Attorney, Agent, or Firm* — Jennifer Luh

(57) ABSTRACT

Methods for liquid adhesive lamination for precision adhesive control are provided. Precision liquid adhesive control can be obtained by first patterning liquid adhesive in a thin pre-coat layer on a substrate. A second adhesive layer can then be patterned on top of the pre-coat layer. When the second substrate is pressed onto the first substrate, the second substrate first comes into contact with the second adhesive layer. The adhesive can then be spread uniformly across the two substrates without forming voids. Alternatively, a single liquid adhesive layer can be formed in a three dimensional gradient pattern.

19 Claims, 13 Drawing Sheets

(56) References Cited

U.S. PATENT DOCUMENTS

| | | | |
|---|---|---|---|
| 6,800,168 | B2 | 10/2004 | Yamaguchi et al. |
| 7,015,894 | B2 | 3/2006 | Morohoshi |
| 7,141,768 | B2 * | 11/2006 | Malofsky et al. ............ 219/645 |
| 7,184,064 | B2 | 2/2007 | Zimmerman et al. |
| 7,663,607 | B2 | 2/2010 | Hotelling et al. |
| 2006/0026521 | A1 | 2/2006 | Hotelling et al. |
| 2006/0197753 | A1 | 9/2006 | Hotelling |
| 2008/0283192 | A1 * | 11/2008 | Shinohara et al. ......... 156/380.2 |
| 2010/0060589 | A1 * | 3/2010 | Wilson .......................... 345/173 |
| 2011/0151202 | A1 | 6/2011 | Feinstein et al. |
| 2011/0168328 | A1 | 7/2011 | Schaper et al. |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

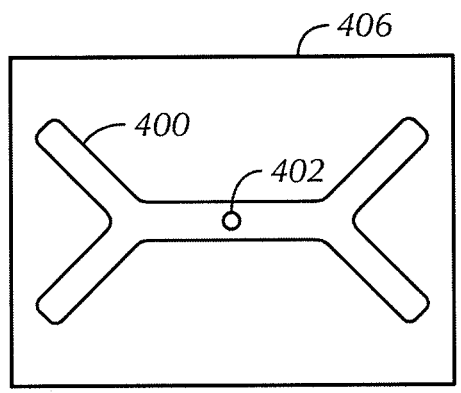
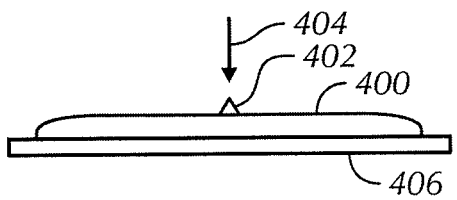
FIG. 4A
FIG.4B
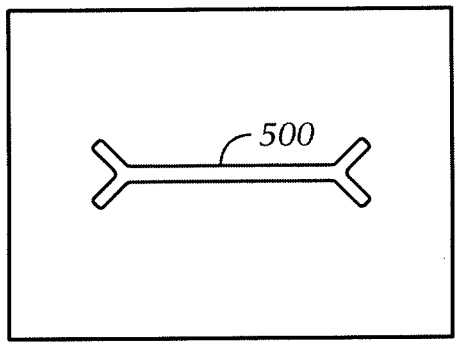
FIG. 5A
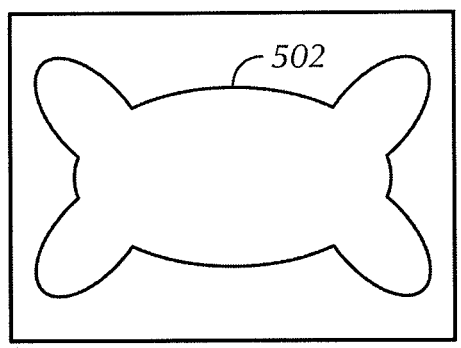
FIG. 5B

LIQUID ADHESIVE LAMINATION FOR PRECISION ADHESIVE CONTROL

FIELD OF THE DISCLOSURE

This relates generally to substrates and, more particularly, to placement of a liquid adhesive on a substrate.

BACKGROUND OF THE DISCLOSURE

Electronic devices can generally include at least one substrate with another substrate and/or electrical components adhered thereto. Fabrication of substrates can involve applying an adhesive to a surface of a substrate and using the applied adhesive to adhere another substrate and/or electrical component to the substrate surface. A liquid adhesive is preferred because of its flowability and compliance, which allows the adhesive to easily cover many different substrate configurations and topologies. However, the adhesive's flowability can also be problematic because of the difficulty in preventing air pockets from forming during the spreading process, causing bubbles or voids in the adhesive as it solidifies, and such voids in the adhesive can interfere with the performance of the substrate device. Additionally, the use of liquid adhesives can result in non-uniform thickness and spread over the substrate, and the adhesive can fail to cover the entire target adhesive area or overflow past the boundaries of the target adhesive area.

SUMMARY

This relates to patterning liquid adhesive on a substrate in a pattern designed to minimize the formation of voids in the adhesive and to provide uniform adhesive coverage and thickness as the substrate is adhered to another substrate and/or electrical components. Liquid adhesive can be patterned on a substrate, and a second substrate can then be pressed onto the first. During this process the dispensed adhesive pattern can spread out into the final coverage area.

Precision liquid adhesive control can be obtained by first patterning liquid adhesive in a thin pre-coat layer on a substrate. The pre-coat layer can allow the adhesive to spread faster over the target adhesive area. A second adhesive layer can then be patterned on top of the pre-coat layer. This second adhesive layer can provide an initial wetting pattern (i.e., the points of first contact between the adhesive and the second substrate). Additionally, the second adhesive layer can be provided in a pattern that will spread in such a way so as to avoid the formation of voids. Accordingly, when the second substrate is pressed onto the first substrate, the second substrate first comes into contact with the second adhesive layer. The adhesive can then be spread uniformly across the two substrates without forming voids.

Alternatively, a single liquid adhesive layer can be formed in a three dimensional gradient pattern. Liquid adhesive can be patterned with varying thickness across the first substrate. For example, the adhesive can be layered in a gradient pyramid pattern. The tip of the pyramid can provide an initial wetting point of first contact between the adhesive and the second substrate. As the two substrates are pushed together, the second substrate comes into contact first with the tip of the pyramid, and then with the sides of the pyramid all the way down to the edges. The adhesive can then be spread uniformly across the two substrates without forming voids.

BRIEF DESCRIPTION OF THE DRAWINGS

FIG. 4A illustrates an exemplary double-Y pattern with a pyramid pattern at its center according to embodiments of the disclosure.

FIG. 4B illustrates an exemplary double-Y pattern with a pyramid pattern at its center according to embodiments of the disclosure.

FIG. 5A illustrates an exemplary double-Y pattern deposited directly on a substrate without a pre-coat layer according to embodiments of the disclosure.

FIG. 5B illustrates an exemplary accelerated double-Y pattern deposited directly on a substrate without a pre-coat layer according to embodiments of the disclosure.

DETAILED DESCRIPTION

Figure 1B:
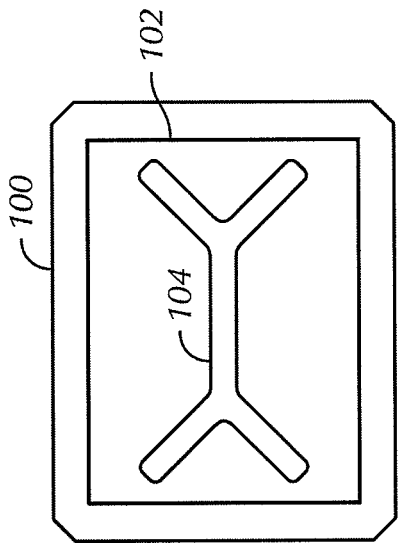
FIG. 1B illustrates an exemplary adhesive patterning process according to embodiments of the disclosure.

In the following description of embodiments, reference is made to the accompanying drawings which form a part hereof, and in which it is shown by way of illustration specific embodiments which can be practiced. It is to be understood that other embodiments can be used and structural changes can be made without departing from the scope of the disclosed embodiments.

Various embodiments relate to patterning liquid adhesive on a substrate in a pattern designed to minimize the formation of voids in the adhesive and to provide uniform adhesive coverage and thickness as the substrate is adhered to another substrate and/or electrical components. Liquid adhesive can be patterned on a substrate, and a second substrate can then be pressed onto the first. During this process the dispensed adhesive pattern can spread out into the final coverage area.

Precision liquid adhesive control can be obtained by first patterning liquid adhesive in a thin pre-coat layer on a substrate. The pre-coat layer can allow the adhesive to spread faster over the target adhesive area. A second adhesive layer can then be patterned on top of the pre-coat layer. This second adhesive layer can provide an initial wetting pattern (i.e., the points of first contact between the adhesive and the second substrate). Additionally, the second adhesive layer can be provided in a pattern that will spread in such a way so as to avoid the formation of voids. Accordingly, when the second substrate is pressed onto the first substrate, the second substrate first comes into contact with the second adhesive layer. The adhesive can then be spread uniformly across the two substrates without forming voids.

Alternatively, a single liquid adhesive layer can be formed in a three dimensional gradient pattern. Liquid adhesive can be patterned with varying thickness across the first substrate. For example, the adhesive can be layered in a gradient pyramid pattern. The tip of the pyramid can provide an initial wetting point of first contact between the adhesive and the second substrate. As the two substrates are pushed together, the second substrate comes into contact first with the tip of the pyramid, and then with the sides of the pyramid all the way down to the edges. The adhesive can then be spread uniformly across the two substrates without forming voids.

Although embodiments may be described and illustrated herein in terms of touch sensor panels, it should be understood that embodiments are not so limited, but are additionally applicable to any substrate with another substrate and/or electrical components adhered thereto. Furthermore, although embodiments may be described and illustrated herein in terms of liquid optically clear adhesive (LOCA), it should be understood that the embodiments are also applicable to other adhesives, including optically translucent and opaque adhesives. Furthermore, although embodiments may be described and illustrate herein in terms of two-substrate lamination, it should be understood that the embodiments are also applicable to multi-layer lamination of any number of substrates, including lamination of a first substrate to a second substrate followed by lamination of a third substrate to the second substrate.

FIGS. 1A-1D illustrate an exemplary method of adhering two substrates according to embodiments of the disclosure. Each figure in the sequence depicts a portion of the described method.

Figure 1D:
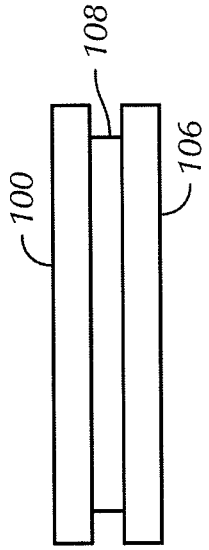
FIG. 1D illustrates an exemplary adhesion process according to embodiments of the disclosure.
Figure 1A:
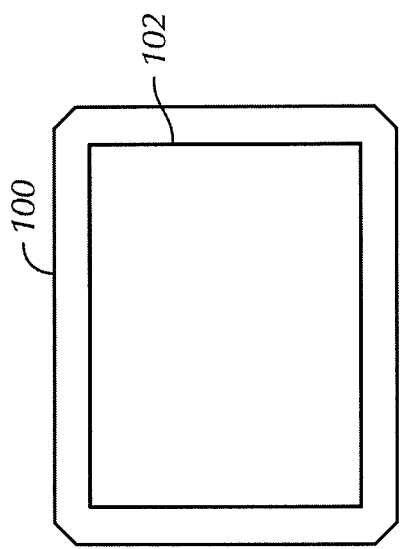
FIG. 1A illustrates an exemplary pre-coat layer deposition process according to embodiments of the disclosure.

FIG. 1A illustrates an exemplary pre-coat layer deposition process according to embodiments of the disclosure. Initially, a first substrate 100 is adapted to receive liquid adhesive in one or more regions on its surfaces in order to hold another substrate or material on the first substrate. In some embodiments, the substrate can be glass, plastic, and the like. The substrate can be flat, curved, flexible, rigid, and the like.

A pre-coat layer 102 of liquid adhesive can be dispensed onto a surface of the first substrate 100. In some embodiments the liquid adhesive can be water- or oil-based, conductive or dielectric, and so on, depending on placement needs. In some embodiments, the pre-coat layer can be formed in a rectangular shape (e.g., as depicted by pre-coat layer 102). However, the pre-coat layer may be formed using any pattern or geometry according to embodiments. The shape of the pre-coat layer may be defined by the shapes of the first substrate and its surfaces as well as the shape of the second substrate or other material to be adhered to the first substrate. A pre-coat layer that thinly covers a target region of a first substrate can reduce the time it takes for any additional layers of adhesive to spread over the target region when a second substrate is pressed onto the first substrate.

FIG. 1B illustrates an exemplary adhesive patterning process according to embodiments of the disclosure. A liquid adhesive pattern 104 can be dispensed on the first substrate 100 on top of the pre-coat layer 102. In some embodiments, the liquid adhesive pattern can form a double-Y pattern (e.g., as depicted by liquid adhesive pattern 104). However, the liquid adhesive pattern may be formed using any pattern or geometry according to various embodiments. The liquid adhesive pattern 104 can be patterned to avoid the formation of voids during the spreading phase. For example, the double-Y pattern of the liquid adhesive pattern 104 can spread outward in such a way so as to avoid the formation of voids. Additionally, the liquid adhesive pattern 104 can be patterned to provide boundary control and uniform spread and thickness over the target adhesive area. Additional liquid adhesive patterns are described with reference to FIGS. 2A-2D.

Figure 1C:
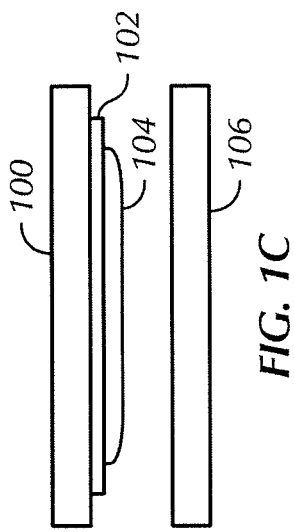
FIG. 1C illustrates an exemplary substrate alignment process according to embodiments of the disclosure.

FIG. 1C illustrates an exemplary substrate alignment process according to embodiments of the disclosure. The first substrate 100 can be aligned with a second substrate 106 with the adhesive layers 102 and 104 facing the second substrate. The two substrates 100 and 106 can be aligned so that, when pressed together, the second substrate will first contact the liquid adhesive pattern 104 before contacting either the pre-coat layer 102 or the first substrate 100. In this way, the liquid adhesive pattern 104 can provide the initial wetting pattern for the adhering process. This can help to ensure that the liquid adhesive pattern 104 will largely determine the spread of the adhesive in such a way so as to avoid the formation of voids or bubbles in the adhesive.

FIG. 1D illustrates an exemplary adhesion process according to embodiments of the disclosure. After alignment, the second substrate 106 can be pressed onto the first substrate 100 until the distance between the two substrates is no less than a target final gap distance. During the adhesion process, the liquid adhesive pattern 104 can spread out over the pre-coat layer 104 to form a single uniform adhesive layer 108 that bonds the first substrate 100 to the second substrate 106. The liquid adhesive pattern 104 can be patterned to avoid the formation of voids in the adhesive layer 108. Additionally, the liquid adhesive pattern 104 can be patterned to provide boundary control and uniform spread and thickness over the target adhesive area.

FIGS. 2A-2J illustrate liquid adhesive patterns according to various embodiments. Each pattern can be dispensed on top of a pre-coat layer according to the method illustrated in FIGS. 1A-1D. Alternatively, each pattern can be dispensed directly on a substrate without a pre-coat layer. The patterns can be designed to provide uniform adhesive coverage and to prevent the formation of voids during the spreading process.

Figure 2B:
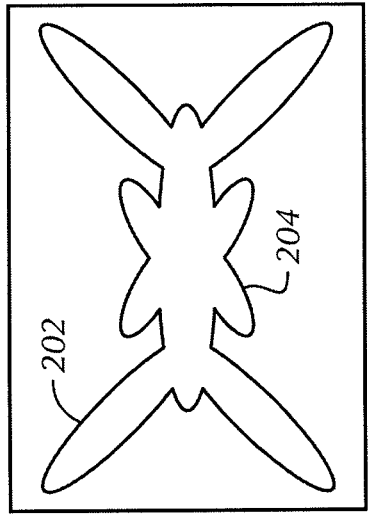
FIG. 2B illustrates an exemplary butterfly adhesive pattern according to embodiments of the disclosure.
Figure 2D:
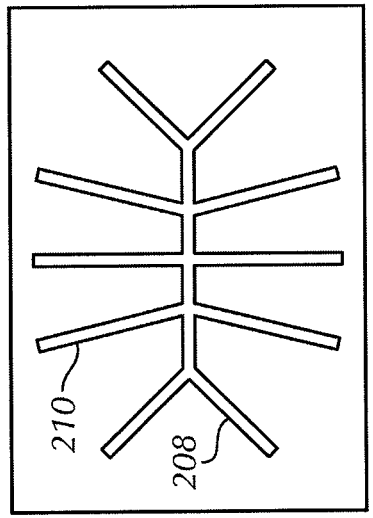
FIG. 2D illustrates an exemplary fishbone pattern according to embodiments of the disclosure.
Figure 2A:
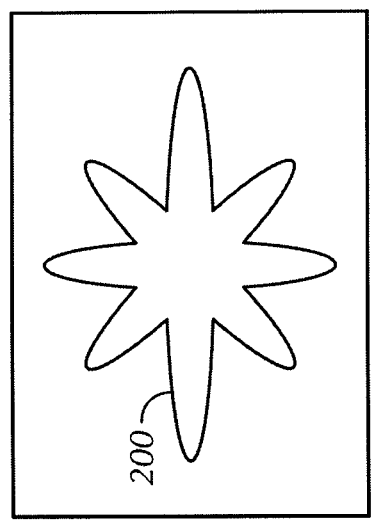
FIG. 2A illustrates an exemplary star adhesive pattern according to embodiments of the disclosure.

FIG. 2A illustrates an exemplary star adhesive pattern 200 according to embodiments of the disclosure. Although FIG. 2A depicts the star pattern 200 with eight arms, any number of arms can be formed according to various embodiments. Furthermore, according to various embodiments, the length and width of each arm can vary according to the shape and size of the substrate and the target region of the adhesive pattern.

FIG. 2B illustrates an exemplary butterfly adhesive pattern 202 according to embodiments of the disclosure. The butterfly adhesive pattern 202 can be formed as a double-Y pattern modified with additional arms such as arm 204. Although FIG. 2B depicts the butterfly pattern 202 as a double-Y pattern modified with four additional arms, any number of additional arms can be formed in a butterfly pattern according to various embodiments.

Figure 2C:
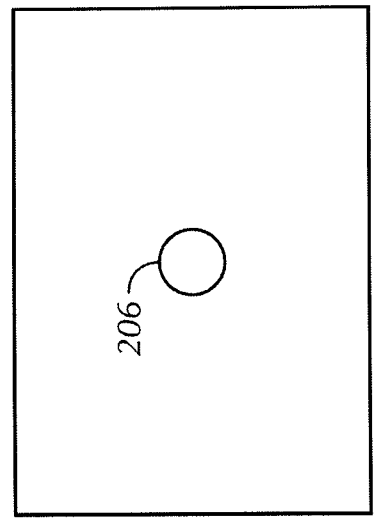
FIG. 2C illustrates an exemplary spot adhesive pattern according to embodiments of the disclosure.

FIG. 2C illustrates an exemplary spot adhesive pattern 206 according to embodiments of the disclosure. The spot pattern 206 can form an initial wetting pattern and can be any size according to various embodiments.

FIG. 2D illustrates an exemplary fishbone pattern 208 according to embodiments of the disclosure. The fishbone pattern 208 can be formed as a narrow double-Y pattern modified with ribs such as rib 210. Although FIG. 2D depicts the fishbone pattern 208 as a narrow double-Y pattern modified with six ribs, any number of ribs can be formed in a fishbone pattern according to various embodiments.

Figure 2E:
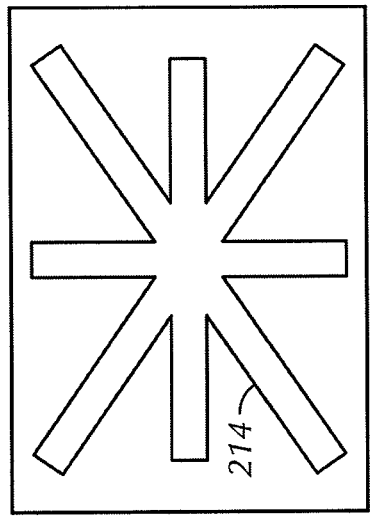
FIG. 2E illustrates an additional exemplary double-Y pattern according to embodiments of the disclosure.

FIG. 2E illustrates an additional exemplary double-Y pattern 212 according to embodiments of the disclosure.

Figure 2F:
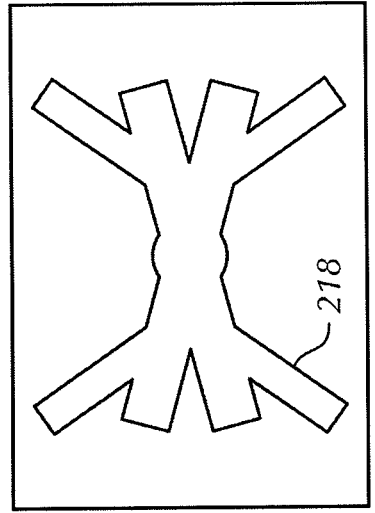
FIG. 2F illustrates an additional exemplary star pattern according to embodiments of the disclosure.

FIG. 2F illustrates an additional exemplary star pattern 214 according to embodiments of the disclosure.

Figure 2G:
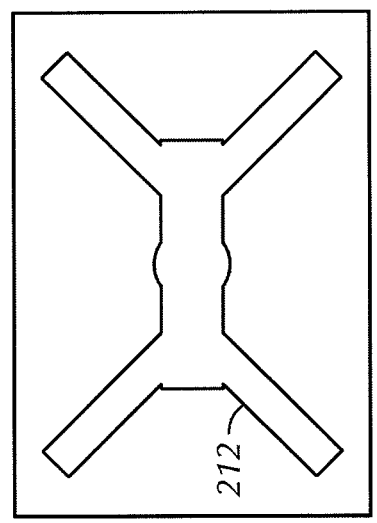
FIG. 2G illustrates an exemplary stinger pattern according to embodiments of the disclosure.

FIG. 2G illustrates an exemplary stinger pattern 216 according to embodiments of the disclosure.

Figure 2H:
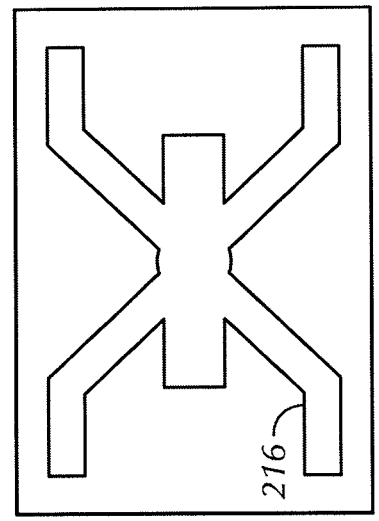
FIG. 2H illustrates an additional exemplary butterfly pattern according to embodiments of the disclosure.

FIG. 2H illustrates an additional exemplary butterfly pattern 218 according to embodiments of the disclosure.

Figure 2J:
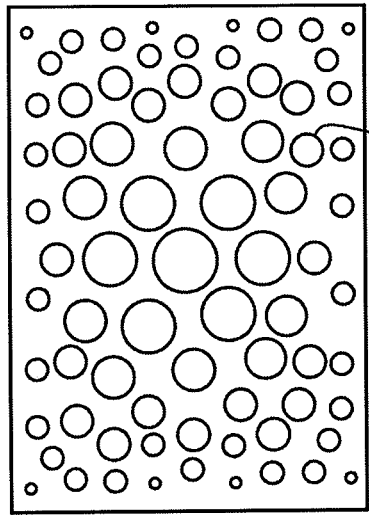
FIG. 2J illustrates an exemplary one drop fill pattern according to embodiments of the disclosure.
Figure 2I:
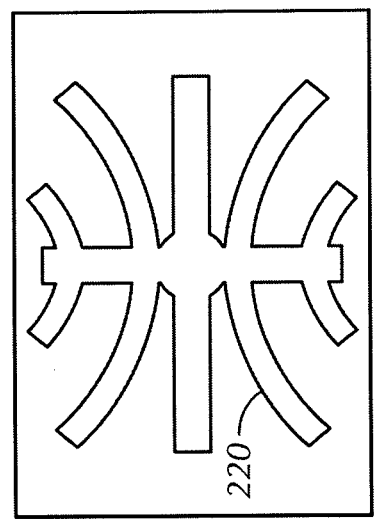
FIG. 2I illustrates an additional exemplary fishbone pattern according to embodiments of the disclosure.

FIG. 2I illustrates an additional exemplary fishbone pattern 220 according to embodiments of the disclosure.

FIG. 2J illustrates an exemplary one drop fill pattern 222 according to embodiments of the disclosure. The one drop fill pattern 222 can be formed as a plurality of adhesive spots across a substrate surface. Each spot can vary in size and thickness. Additionally, a one drop fill pattern can be formed with any number of spots. According to some embodiments, spots near the center of a substrate can be larger and thicker than spots around the perimeter of the substrate. The one drop fill pattern 222 can be formed to provide uniform thickness and boundary control after the spreading process.

FIGS. 3A-3E illustrate an exemplary spreading process according to embodiments of the disclosure. Each figure in the sequence depicts a time-lapse snapshot of the described process.

Figure 3B:
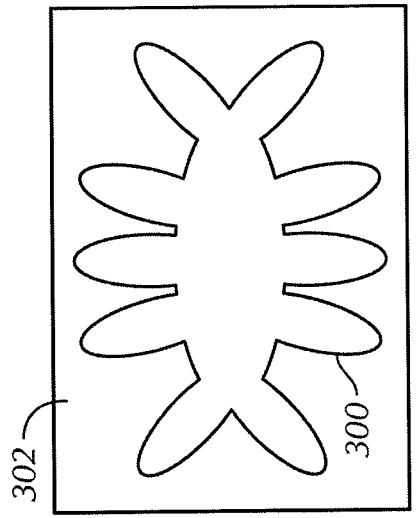
FIG. 3B illustrates an exemplary fishbone pattern during the spreading process according to embodiments of the disclosure.
Figure 3A:
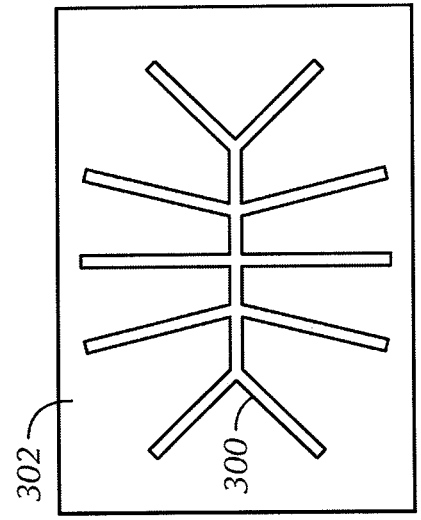
FIG. 3A illustrates an exemplary fishbone pattern according to embodiments of the disclosure.

FIG. 3A illustrates an exemplary fishbone pattern 300 according to embodiments of the disclosure. The fishbone 300 has been patterned on a pre-coat layer 302.

FIG. 3B illustrates an exemplary fishbone pattern 300 during the spreading process according to embodiments of the disclosure. At an early point in the spreading process after a second substrate has been pressed onto a first substrate, the fishbone pattern 300 may begin to spread out over the pre-coat layer 302, and the arms and ribs of the pattern may begin to broaden.

Figure 3C:
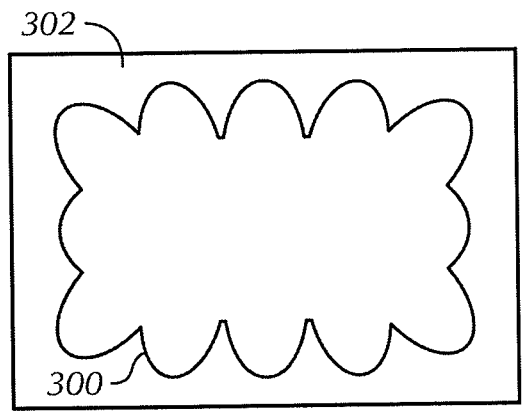
FIG. 3C illustrates an exemplary fishbone pattern during the spreading process according to embodiments of the disclosure.

FIG. 3C illustrates an exemplary fishbone pattern 300 during the spreading process according to embodiments of the disclosure. As the spreading continues, the arms and the ribs may begin to flow into one another.

Figure 3D:
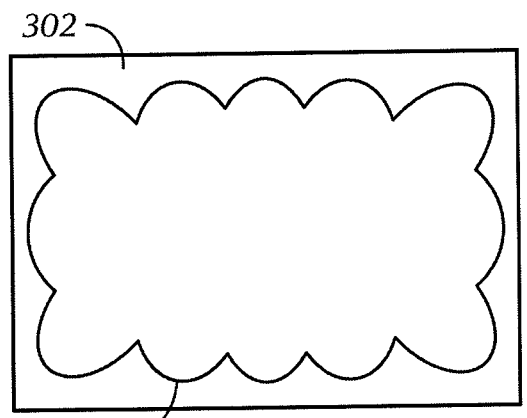
FIG. 3D illustrates an exemplary fishbone pattern during the spreading process according to embodiments of the disclosure.

FIG. 3D illustrates an exemplary fishbone pattern 300 during the spreading process according to embodiments of the disclosure. As the spreading is nearly complete, the arms and the ribs may flow into a uniform layer over the pre-coat layer 302. The initial configuration of the arms and ribs can prevent voids from forming as the pattern spreads.

Figure 3E:
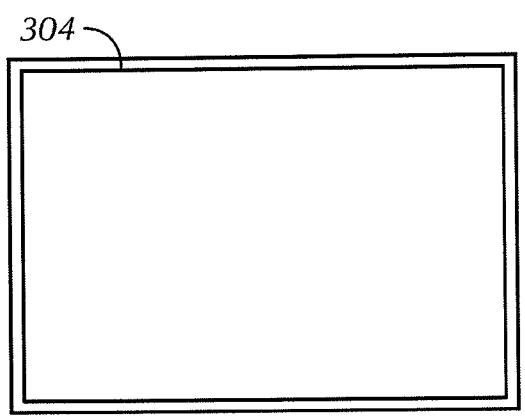
FIG. 3E illustrates an exemplary fishbone pattern after the spreading process according to embodiments of the disclosure.

FIG. 3E illustrates an exemplary fishbone pattern after the spreading process according to embodiments of the disclosure. After the spreading process is complete, the fishbone pattern 300 and the pre-coat layer 302 can flow into a single uniform adhesive layer 304.

In some embodiments, an electrical field can be applied to the liquid adhesive pattern to create an initial wetting pattern that can be smaller in area than the liquid adhesive pattern itself FIGS. 4A and 4B illustrate an exemplary double-Y pattern 400 with a pyramid pattern 402 at its center according to embodiments of the disclosure. After the liquid adhesive pattern 400 has been deposited, an electrical field 404 can be applied to the liquid adhesive pattern to create an initial wetting pattern in the form of a pyramid pattern 402. The electrical field can create an electrical attraction at a target location, causing the liquid adhesive at that location to form a pyramid pattern, such as pyramid pattern 402. Although FIGS. 4A and 4B depict the liquid adhesive pattern 400 as a double-Y pattern, an electrical field can be applied to any liquid adhesive pattern to create an initial wetting pattern according to various embodiments. Additionally, although FIGS. 4A and 4B depict the initial wetting pattern 402 as a pyramid pattern, an electrical field can be applied to create other initial wetting patterns according to various embodiments.

FIG. 5A illustrates an exemplary double-Y pattern 500 deposited directly on a substrate without a pre-coat layer according to embodiments of the disclosure. Any liquid adhesive pattern can be deposited directly on a first substrate without a pre-coat layer, according to various embodiments. However, the spreading process can take more time without a pre-coat layer.

FIG. 5B illustrates an exemplary accelerated double-Y pattern 502 deposited directly on a substrate without a pre-coat layer according to embodiments of the disclosure. An accelerated double-Y pattern can mimic the shape of a normal double-Y pattern after it has partially spread. Accordingly, the spreading process for the accelerated double-Y pattern 502 can take less time than the spreading process for the double-Y pattern 500. In various embodiments, any liquid adhesive pattern can be deposited as an accelerated pattern, mimicking the shape of the liquid adhesive pattern after it has partially spread.

Figure 6:
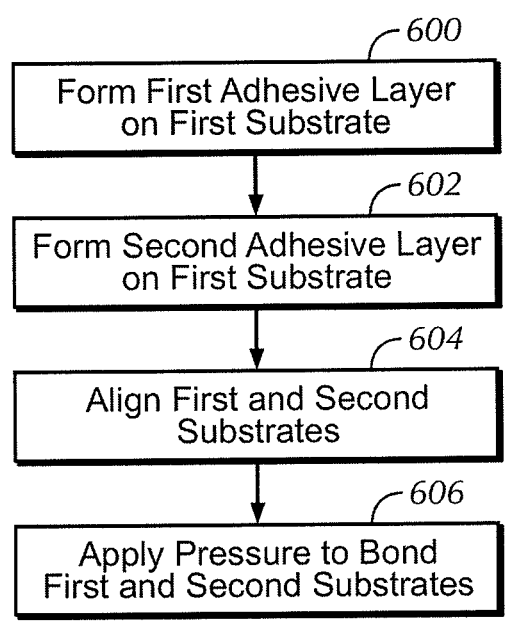
FIG. 6 is a high-level flow diagram illustrating an exemplary method of adhering two substrates according to embodiments of the disclosure.

FIG. 6 is a high-level flow diagram illustrating an exemplary method of adhering two substrates according to embodiments of the disclosure. At block 600, a first adhesive layer can be formed on a first substrate. The first adhesive layer can be a pre-coat layer formed over an entire target adhesive region of the substrate.

At block 602, a second adhesive layer can be formed on the first substrate. The second adhesive layer can be thicker than the first adhesive layer, and it can form a liquid adhesive pattern. The liquid adhesive pattern can be a star pattern, a butterfly pattern, a spot pattern, a fishbone pattern, or the like.

At block 604, the first and second substrates can be aligned. The first and second substrates can be aligned so that, when pressed together, the second substrate will first contact the liquid adhesive pattern before contacting either the pre-coat layer or the first substrate. In this way, the liquid adhesive pattern can provide the initial wetting pattern for the adhering process.

At block 606, pressure can be applied to bond the first and second substrates. The second substrate can be pressed onto the first substrate until the distance between the two substrates is no less than a target final gap distance. During the adhesion process, the liquid adhesive pattern can spread out over the pre-coat layer to form a single adhesive layer that bonds the first substrate to the second substrate.

Figure 7A:
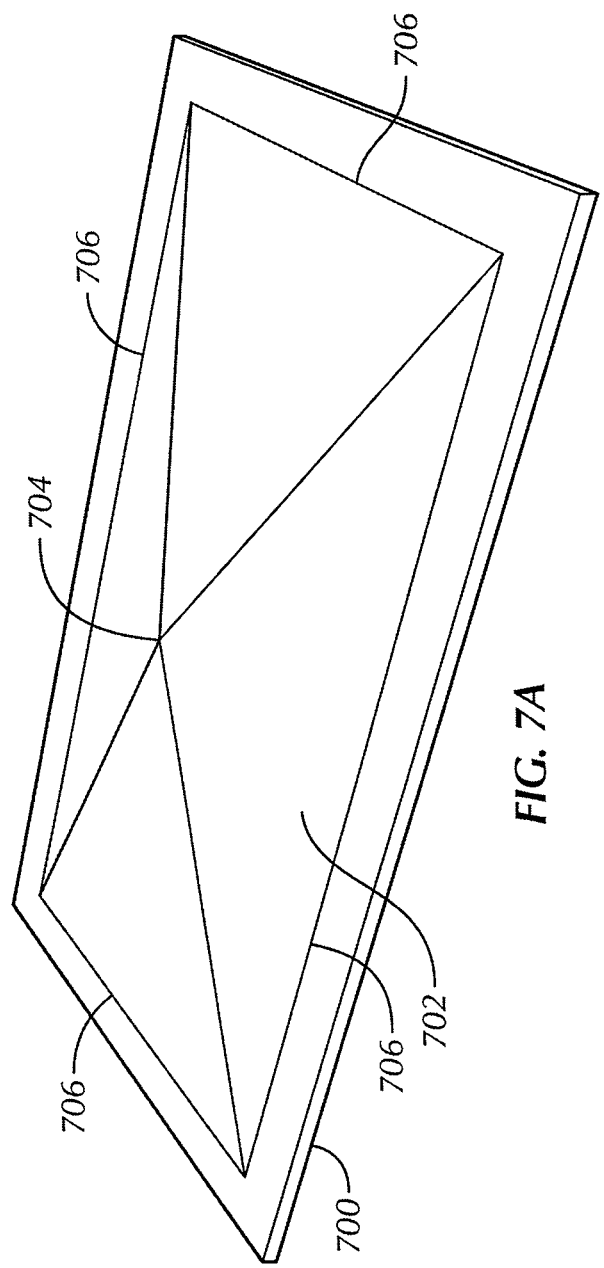
FIG. 7A illustrates an exemplary gradient pyramid pattern formed on a first substrate according to embodiments of the disclosure.
Figure 7B:
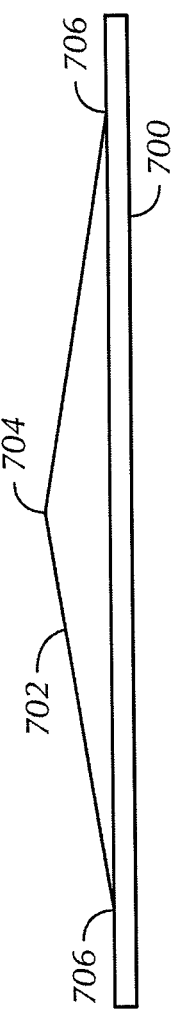
FIG. 7B illustrates an exemplary gradient pyramid pattern formed on a first substrate according to embodiments of the disclosure.

FIGS. 7A and 7B illustrate an exemplary gradient pyramid pattern formed on a first substrate according to embodiments of the disclosure. A three dimensional gradient pattern 702 can be formed on a first substrate 700. In a three dimensional gradient pattern, the thickness of the adhesive layer can vary across the surface of the first substrate. For example, in the gradient pyramid pattern 702, at the apex of the pattern 704 the adhesive layer can be thicker than at the edges of the pattern 706. Additionally, the thickness of the adhesive layer can vary between the edges 706 and the apex 704. Accordingly, the adhesive layer can be thicker in the center region of the first substrate than in the edge region of the first substrate. In alternate embodiments, the adhesive layer can be thicker in the edge region than in the center region.

According to various embodiments, the thickest portions of the adhesive layer in a three dimensional gradient pattern can form an initial wetting pattern between the adhesive and a second substrate as the first and second substrates are pushed together. For example, the apex 704 of the gradient pyramid pattern 702 can form an initial wetting pattern.

Figure 8:
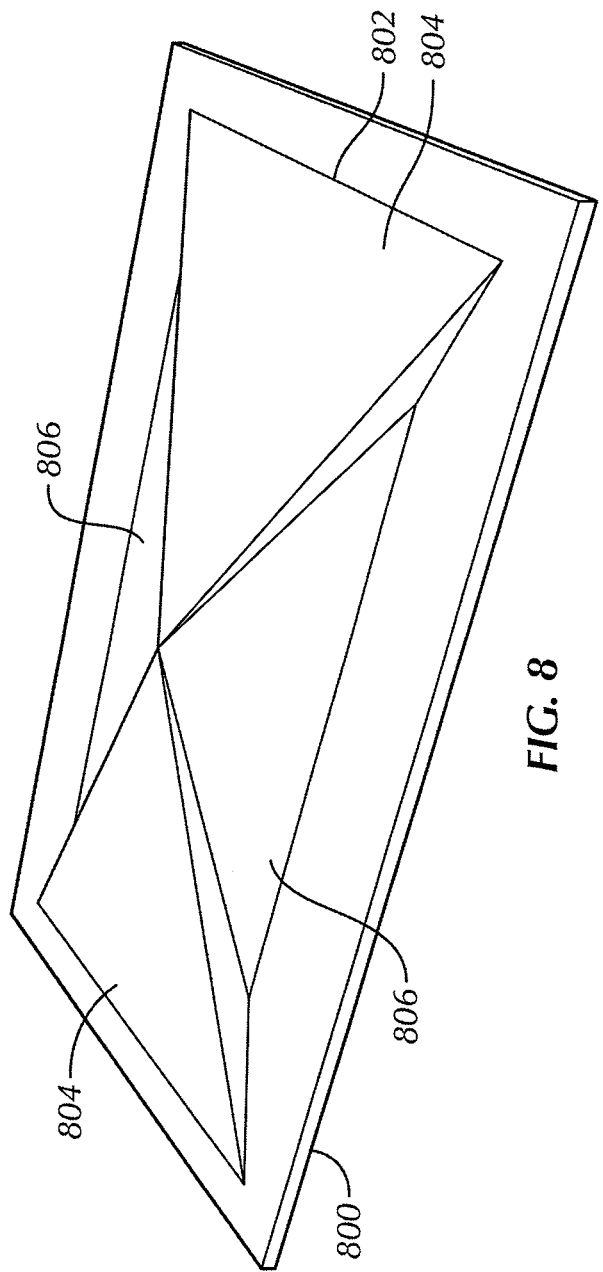
FIG. 8 illustrates a modified gradient pyramid pattern according to embodiments of the disclosure.

Although FIGS. 7A and 7B depict a gradient pyramid pattern 702, a three dimensional gradient pattern can be formed as any pattern with varying adhesive layer thickness across the surface of a substrate. FIG. 8 illustrates a modified gradient pyramid pattern according to embodiments of the disclosure. A three dimensional gradient pattern may be configured to control uniform adhesive spreading. For example, modified gradient pyramid pattern 802 can be formed on a first substrate 800. First pyramid sides 804 can be formed closer to the edges of the first substrate 800 than second pyramid sides 806. As a result, there can be less adhesive at sides 806 than at sides 804. Such a configuration can control adhesive flow during the spreading process so that liquid adhesive does not flow outside a target adhesive area. Furthermore, such a configuration can ensure that after the spreading process the liquid adhesive uniformly covers the target adhesive area.

A three dimensional gradient pattern of liquid adhesive can be formed by any of several methods according to various embodiments. For example, an adhesive dispenser can vary its dispensing rate as it moves across a substrate. A region subject to a dispensing rate higher than in other regions can accumulate more adhesive, resulting in a thicker adhesive layer in such a region. By this process, the thickness of the adhesive layer can be varied across the surface of the substrate. In some embodiments, the same result can be achieved by varying the movement speed of the dispenser as the dispenser moves across a substrate and dispenses at a constant rate.

In some embodiments, liquid adhesive can be applied through a stencil or mesh that varies the area of each opening. A region beneath an opening larger than other openings in the stencil or mesh can accumulate more adhesive, resulting in a thicker adhesive layer in such a region. By this process, the thickness of the adhesive layer can be varied across the surface of the substrate.

In some embodiments, a three dimensional gradient pattern can be formed by applying a differential electrical field to an adhesive layer according to some embodiments. A region subject to an electrical attraction stronger than in other regions can accumulate more adhesive, resulting in a thicker adhesive layer in such a region. By this process, the thickness of the adhesive layer can be varied across the surface of the substrate.

Additionally, a three dimensional gradient pattern can be formed by combinations of various dispensing methods. For example, a three dimensional gradient pattern can be formed by first dispensing adhesive at a varying dispense rate across the surface of a substrate and then applying a differential electrical field to the adhesive.

Figure 14:
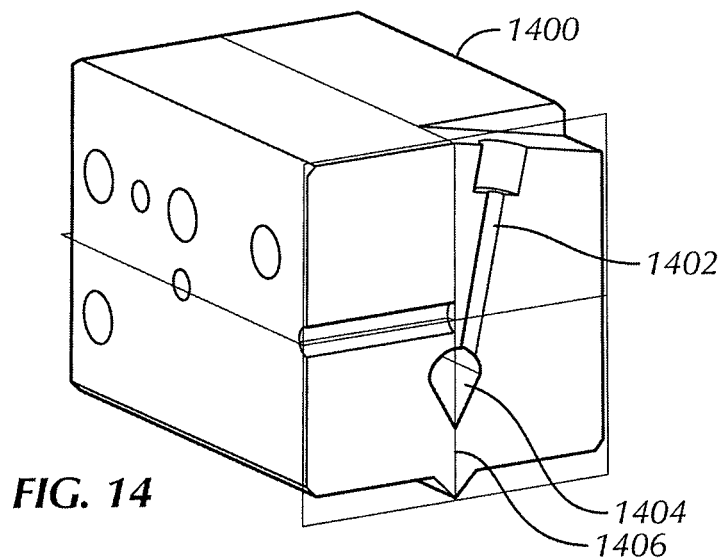
FIG. 14 illustrates an exemplary adhesive dispenser according to embodiments of the disclosure.

FIG. 14 illustrates an exemplary adhesive dispenser 1400 according to embodiments of the disclosure. Liquid adhesive flows from an inlet 1402, through a cavity 1404, and out a slot 1406. According to various embodiments, an inlet can have horizontal, vertical, or diagonal portions. Additionally, an inlet can have any width to accommodate adhesive flow.

Figure 15:
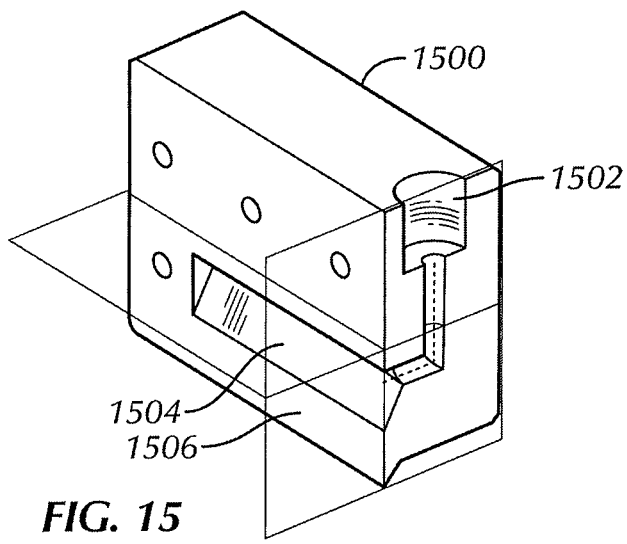
FIG. 15 illustrates an additional exemplary adhesive dispenser according to embodiments of the disclosure.

FIG. 15 illustrates an additional exemplary adhesive dispenser 1500 according to embodiments of the disclosure. Both a cavity 1504 and a slot 1506 can extend along the length of the adhesive dispenser 1500. Accordingly, the slot 1506 can dispense adhesive across the length of a substrate and then cover the entire target adhesive area as the dispenser moves across the width of the substrate. Additionally, the movement speed of the dispenser can be varied to vary the thickness of the dispensed adhesive layer.

The slot width can be varied along the length of the adhesive dispenser to vary the adhesive dispense rate along the length of the dispenser. For example, if a first portion of the slot 1506 is wider than a second portion of the slot, liquid adhesive can be dispensed at a higher rate out of the first portion than out of the second portion. Alternatively, the width of the cavity 1504 can be tapered along the length of the dispenser to achieve a similar effect. Accordingly, the adhesive dispenser 1500 can be used to form a three dimensional gradient pattern on a substrate by dispensing an adhesive layer that varies in thickness across the surface of a substrate.

Figure 16:
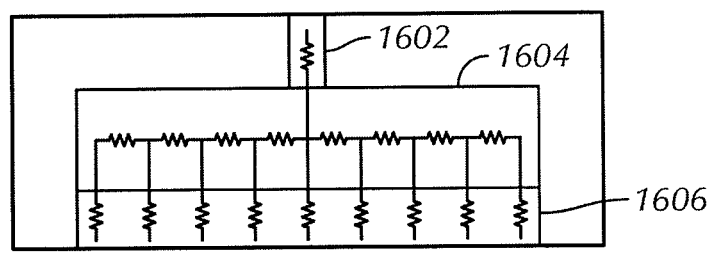
FIG. 16 illustrates an equivalent functional drawing of adhesive flow through an adhesive dispenser according to embodiments of the disclosure.

FIG. 16 illustrates an equivalent functional drawing of adhesive flow through an adhesive dispenser according to embodiments of the disclosure. The resistance at the inlet 1602 can determine the rate at which adhesive is accepted into the dispenser. The resistance of the cavity 1604 can increase along the length of dispenser as the cavity tapers to a more narrow width. Accordingly, adhesive flow can vary at each portion of the cavity 1604, depending on the distance from the inlet and the width of the cavity. Finally, the resistance of the slot 1606 can vary as the slot width is varied along the length of the dispenser, and thus adhesive flow can vary at each portion of the slot according to the width of slot.

In some embodiments, a dispenser can have multiple inlets, each with separate cavities and slots. Alternatively, each cavity can all flow to the same slot. Each cavity can be a different size, which can affect the dispense rate out of each slot. For example, if a first cavity is larger than a second cavity, then liquid adhesive can flow faster through the first cavity than through the second cavity. Accordingly, an adhesive dispenser can be used to form a three dimensional gradient pattern on a substrate by dispensing an adhesive layer that varies in thickness across the surface of a substrate.

Figure 9:
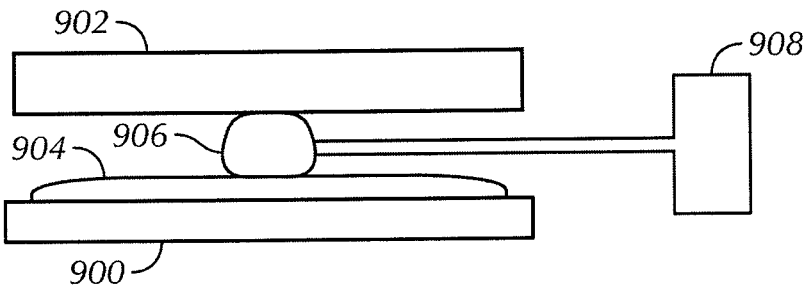
FIG. 9 illustrates an exemplary needle gap process according to embodiments of the disclosure.

According to embodiments of the disclosure, an initial wetting pattern can be formed in several other ways. FIG. 9 illustrates an exemplary needle gap process according to embodiments of the disclosure. A pre-coat layer 904 can be formed on a first substrate 900. The first substrate can be aligned to a second substrate 902. Liquid adhesive 906 can then be dispensed by a needle dispenser 908. The liquid adhesive 906 can be dispensed, and an initial wetting pattern can be created as the liquid adhesive contacts both the second substrate 902 and the pre-coat layer 904. The needle dispenser 908 can be removed, and the second substrate 902 can be pressed onto the first substrate 900 until the distance between the two substrates is no less than a target final gap distance.

Figure 10A:
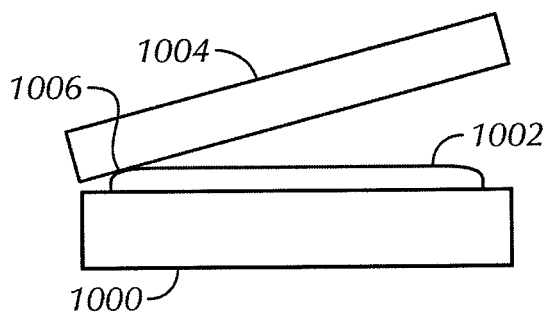
FIG. 10A illustrates an exemplary bird-beak process according to embodiments of the disclosure.
Figure 10B:
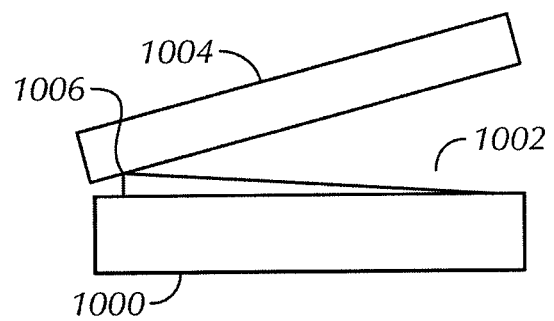
FIG. 10B illustrates an additional exemplary bird-beak process according to embodiments of the disclosure.

FIGS. 10A and 10B illustrate an exemplary bird-beak process according to embodiments of the disclosure. A pre-coat layer 1002 can be formed on a first substrate 1000. A second substrate 1004 can then be aligned at an angle to the first substrate 1000 such that an initial wetting pattern 1006 can be formed between the second substrate and the pre-coat layer 1002. The second substrate 1004 can then be moved such that the angle between the second substrate and the first substrate 1000 is decreased and the pre-coat layer 1002 can bond with the target adhesive region of the second substrate.

In some embodiments the pre-coat layer 1002 can be a three dimensional gradient pattern, as illustrated in FIG. 10B. The layer can be thickest in the region of the initial wetting pattern 1006. In such an embodiment, excess adhesive can be pushed from the region of the initial wetting pattern 1006 to other regions of the first substrate as the two substrates are pushed together.

Figure 11:
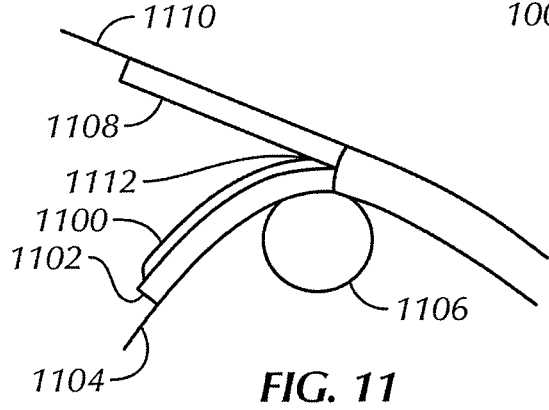
FIG. 11 illustrates an exemplary bird-beak process with a flexible substrate according to embodiments of the disclosure.

A bird-beak process can also be accomplished with a flexible substrate on a roller. FIG. 11 illustrates an exemplary bird-beak process with a flexible substrate according to embodiments of the disclosure. A pre-coat layer 1100 can be formed on a flexible first substrate 1102. The flexible first substrate 1102 can be moved on a first conveyor 1104 across a roller 1106. Additionally, a second substrate 1108 can be moved on a second conveyor 1110. The movement of the first conveyor 1104 and the second conveyor 1110 can cause the second substrate 1108 to contact the pre-coat layer 1100 at an initial wetting pattern 1112. As the two conveyors move, the pre-coat layer 1002 can bond with the target adhesive region of the second substrate. In some embodiments, at least one of the first and second substrates can be flexible.

Figure 12:
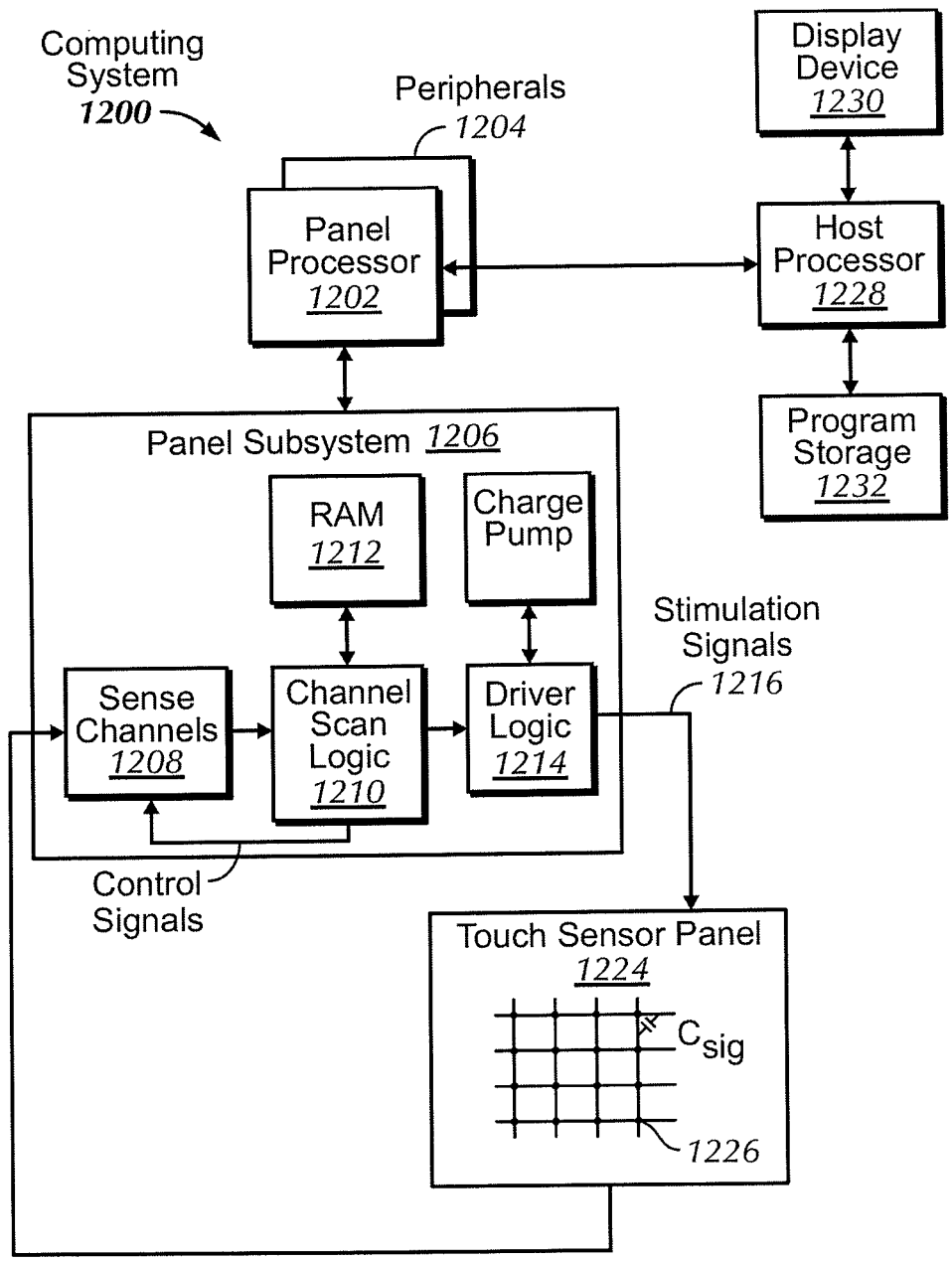
FIG. 12 illustrates an exemplary computing system including a touch sensor panel situated on a substrate that has been adhered to another substrate and/or electrical components according to embodiments of the disclosure.

FIG. 12 illustrates exemplary computing system 1200 that can include a touch sensor panel 1224 situated on a substrate that has been adhered to another substrate and/or electrical components by one or more of the embodiments described above. Computing system 1200 can include one or more panel processors 1202 and peripherals 1204, and panel subsystem 1206. Peripherals 1204 can include, but are not limited to, random access memory (RAM) or other types of memory or storage, watchdog timers and the like. Panel subsystem 1206 can include, but is not limited to, one or more sense channels 1208, channel scan logic 1210 and driver logic 1214. Channel scan logic 1210 can access RAM 412, autonomously read data from the sense channels and provide control for the sense channels. In addition, channel scan logic 1210 can control driver logic 1214 to generate stimulation signals 1216 at various frequencies and phases that can be selectively applied to drive lines of touch sensor panel 1224. In some embodiments, panel subsystem 1206, panel processor 1202 and peripherals 1204 can be integrated into a single application specific integrated circuit (ASIC).

Touch sensor panel 1224 can include a capacitive sensing medium having a plurality of drive lines and a plurality of sense lines, although other sensing media can also be used. Each intersection of drive and sense lines can represent a capacitive sensing node and can be viewed as picture element (pixel) 1226, which can be particularly useful when touch sensor panel 1224 is viewed as capturing an "image" of touch. (In other words, after panel subsystem 1206 has determined whether a touch event has been detected at each touch sensor in the touch sensor panel, the pattern of touch sensors in the multi-touch panel at which a touch event occurred can be viewed as an "image" of touch (e.g. a pattern of fingers touching the panel).) Each sense line of touch sensor panel 1224 can drive sense channel 1208 (also referred to herein as an event detection and demodulation circuit) in panel subsystem 1206.

Computing system 1200 can also include host processor 1228 for receiving outputs from panel processor 1202 and performing actions based on the outputs that can include, but are not limited to, moving an object such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 1228 can also perform additional functions that may not be related to panel processing, and can be coupled to program storage 1232 and display device 1230 such as an LCD display for providing a UI to a user of the device. Display device 1230 together with touch sensor panel 1224, when located partially or entirely under the touch sensor panel, can form touch screen 1218. Display device 1230 can be adhered to touch sensor panel 1224 by one or more of the embodiments described above.

Figure 13A:
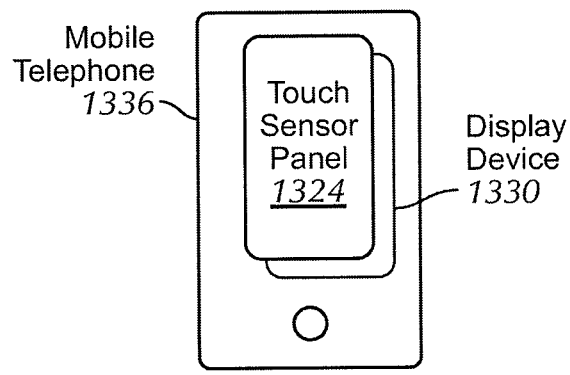
FIG. 13A illustrates an exemplary mobile telephone having a touch sensor panel situated on a substrate that has been adhered to another substrate and/or electrical components according to embodiments of the disclosure.

FIG. 13A illustrates exemplary mobile telephone 1336 that can include touch sensor panel 1324 and display device 1330, the touch sensor panel situated on a substrate that has been adhered to another substrate and/or electrical components by one or more of the embodiments described above.

Figure 13B:
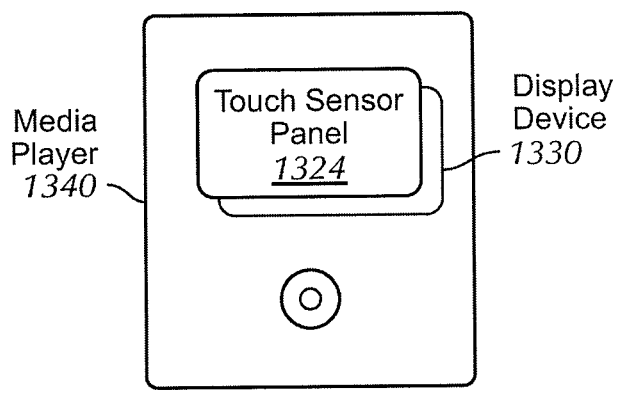
FIG. 13B illustrates an exemplary digital media player having a touch sensor panel situated on a substrate that has been adhered to another substrate and/or electrical components according to embodiments of the disclosure.

FIG. 13B illustrates exemplary digital media player 1340 that can include touch sensor panel 1324 and display device 1330, the touch sensor panel situated on a substrate that has been adhered to another substrate and/or electrical components by one or more of the embodiments described above.

Figure 13C:
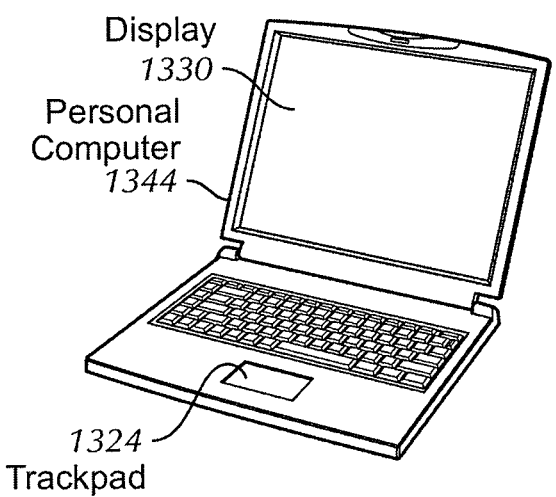
FIG. 13C illustrates an exemplary personal computer having a touch sensor panel (trackpad) and/or display situated on a substrate that has been adhered to another substrate and/or electrical components according to embodiments of the disclosure.

FIG. 13C illustrates exemplary personal computer 1344 that can include touch sensor panel (trackpad) 1324 and display 1330, the touch sensor panel and/or display of the personal computer (in embodiments where the display is part of a touch screen) including a substrate that has been adhered to another substrate and/or electrical components by one or more of the embodiments described above. The mobile telephone, media player and personal computer of FIGS. 13A, 13B and 13C can achieve improved overall durability by utilizing the substrate adhesive layer formed according to various embodiments.

Although the disclosed embodiments have been fully described with reference to the accompanying drawings, it is to be noted that various changes and modifications will become apparent to those skilled in the art. Such changes and modifications are to be understood as being included within the scope of the disclosed embodiments as defined by the appended claims.

What is claimed is:

1. A method comprising:
   forming an adhesive layer on a first substrate;
   aligning a second substrate to the first substrate; and
   applying a pressure to bond the first substrate to the second substrate, wherein the adhesive layer is formed in a three dimensional gradient pattern, wherein the three dimensional gradient pattern has at least one planar surface that extends above a surface of the first substrate, and wherein the three dimensional gradient pattern is a gradient pyramid pattern, wherein the first substrate is associated with an electronic device.

2. The method of claim 1, wherein first opposing sides of the gradient pyramid pattern are closer to first opposing edges of the first substrate than second opposing sides of the gradient pyramid pattern are to second opposing edges of the first substrate.

3. The method of claim 1, wherein the adhesive layer is thicker in a first region of the first substrate than in a second region of the first substrate.

4. The method of claim 3, wherein applying pressure to bond the first substrate to the second substrate includes forming an initial wetting pattern between the second substrate and the portion of the adhesive layer in the first region of the first substrate as the substrates are being pushed together.

5. The method of claim 3, wherein forming the adhesive layer on the first substrate comprises:
   dispensing adhesive on the first substrate; and
   applying an electrical field to the adhesive, wherein an attraction force of the electrical field is stronger in the first region of the first substrate than in the second region of the first substrate.

6. The method of claim 3, wherein aligning the second substrate to the first substrate includes aligning the second substrate at an angle to the first substrate, and wherein applying pressure to bond the first substrate to the second substrate includes moving the second substrate such that the angle between the second substrate and the first substrate is decreased.

7. the method of claim 6, wherein applying pressure to bond the first substrate to the second substrate includes pushing excess adhesive from the first region to the second region.

8. The method of claim 6, wherein at least one of the first and second substrates is a flexible substrate.

9. the method of claim 8, wherein at least one of the first and second substrates is moved on a conveyor across a roller, thereby decreasing the angle between the second substrate and the first substrate.

10. The method of claim 1, wherein the gradient pyramid pattern comprises a protruding portion of the adhesive layer.

11. A method comprising:
    forming an adhesive layer on a first substrate by forming the adhesive layer in a three dimensional gradient pattern that includes a first portion and a protruding second portion on the first portion;
    aligning a second substrate to the first substrate; and
    applying pressure to bond the first substrate to the second substrate, wherein at least one of the first and second substrates comprises a touch sensor substrate.

12. The method defined in claim 11 wherein the first portion is formed in contact with the first substrate.

13. The method defined in claim 12 wherein the first portion comprises a center, and wherein the protruding second portion is a pyramid patterned portion that is located at the center of the first portion.

14. The method defined in claim 13 wherein the pyramid patterned portion comprises a tip and wherein applying pressure to bond the first substrate to the second substrate comprises moving the second substrate into contact with the tip of the pyramid patterned portion.

15. A method comprising:
    forming a patterned adhesive layer on a substrate that is associated with an electronic device display, wherein the patterned adhesive layer is formed in a three dimensional gradient pattern;
    aligning an additional substrate to the substrate that is associated with the electronic device display; and
    adhering the substrate that is associated with the electronic device display to the second substrate using the patterned adhesive layer, wherein forming the patterned adhesive layer comprises forming a pyramid shaped patterned adhesive layer.

16. the method defined in claim 15, wherein the substrate that is associated with the electronic device display comprises a portion of a liquid crystal display.

17. The method defined in claim 15, wherein the additional substrate comprises a touch sensor panel situated on the substrate.

18. The method defined in claim 17, wherein forming the patterned adhesive layer comprises:
    forming a first patterned adhesive layer; and
    forming a protrusion on the first patterned adhesive layer.

19. The method defined in claim 18, wherein forming the protrusion on the first patterned adhesive layer comprises forming a pyramid pattern on the first patterned adhesive layer.

* * * * *